United States Patent [19]

Hirai et al.

[11] 4,202,475
[45] May 13, 1980

[54] METHOD AND APPARATUS FOR CUTTING OPTICAL FIBERS

[75] Inventors: Masataka Hirai, Mito; Koichiro Matsuno, Yokohama, both of Japan

[73] Assignees: Nippon Telegraph and Telephone Public Corp., Tokyo; Sumitomo Electric Industries, Ltd., Osaka, both of Japan; Sumitomo Electric Industries, Ltd., Osaka, both of Japan

[21] Appl. No.: 929,056

[22] Filed: Jul. 28, 1978

[30] Foreign Application Priority Data

Aug. 1, 1977 [JP] Japan ................................ 52/92324

[51] Int. Cl.² .............................................. B26F 3/00
[52] U.S. Cl. ..................................... 225/2; 225/96.5
[58] Field of Search ........................... 225/2, 96.5, 93; 65/DIG. 7

[56] References Cited

U.S. PATENT DOCUMENTS

| | | | |
|---|---|---|---|
| 3,934,773 | 1/1976 | Chinnock et al. | 225/96.5 X |
| 4,017,013 | 4/1977 | Hawk et al. | 225/96.5 |
| 4,036,419 | 7/1977 | Hensel et al. | 225/96.5 |
| 4,046,298 | 9/1977 | Schroeder, Jr. | 225/2 |
| 4,074,840 | 2/1978 | Fulenwider et al. | 225/96.5 |

*Primary Examiner*—Frank T. Yost
*Attorney, Agent, or Firm*—Sughrue, Rothwell, Mion, Zinn and Macpeak

[57] ABSTRACT

A method and apparatus for cutting simultaneously a plurality of glass fibers at an uncoated end portion so as to provide smooth mirror planar cut surfaces. The method of the present invention comprises the steps of removably securing each of the fibers on either side of a cutting point, placing each of the secured fibers on a resilient material provided in the region of the cutting point, scoring the outer surface of each of the fibers at the cutting point, and arcuately bending each of the fibers between the secured portions so as to impart a tension along the axial direction of each of the fibers, whereby the cutting occurs at the cutting point. Two embodiments of the apparatus of the present invention which perform the cutting operation in accordance with the method of the present invention are disclosed.

6 Claims, 13 Drawing Figures

METHOD AND APPARATUS FOR CUTTING OPTICAL FIBERS

BACKGROUND OF THE INVENTION

1. Field of the Invention

The present invention relates generally to a method and apparatus for cutting glass fiber, and more particularly, to a method and apparatus for cutting simultaneously a plurality of glass fibers.

2. Description of the Prior Art

In case of practical use of glass fibers as optical transmission lines, connection of the fibers is required during installation. This connecting requires that there be small transmission losses at the connecting point, and that the connecting method be inexpensive, accurate and easy to perform.

One conventional method of connection involves abutting the planar edges of the fibers by setting them in V-shaped grooves or by inserting them into a connector that performs the same function. Another conventional method is to melt-bond the abutted planer edges.

In the above methods, the planar edges of the fibers are required to be perpendicular to the axis of the fibers and have a mirror surface, otherwise, a clearance space or air bubbles may be created at the connection point, thereby increasing transmission losses.

In order to obtain the desired smooth planar edge surface, various analyses have been conducted on the various cutting methods. One such cutting method involves removing the coating layer from the raw fiber line (hereinafter referred to as a raw line) and then scoring the surface of the raw line at the point where the cut is desired. Then the raw line is subjected to a tensile stress causing the cut to occur. A variation on this method is to cut the raw line under tension.

In practice, however, it is difficult to faithfully cut the line and provide the required smooth mirror surface. Several methods have been used to correct an unsatisfactory cut. One such method is to grind the cut edge so as to polish the surface. Another method is to use solvents and the like to reduce chemically the unconformable areas of the cut edge.

In addition, in case of the connection of a plurality of fibers, such as a cable having multiple fibers and ribbon-like fibers, the edge cutting becomes an even more important and difficult problem.

SUMMARY OF THE INVENTION

It is an object of the present invention to provide a method and apparatus for cutting simultaneously a plurality of raw glass fibers.

It is another object of the present invention to provide a method and apparatus for cutting a plurality of raw glass fibers so as to provide the required smooth mirror planar surfaces.

It is a further object of the present invention to provide an apparatus for cutting automatically a plurality of raw glass fibers so as to provide the required smooth mirror planar surfaces.

Specifically, the present invention relates to a method and apparatus for cutting simultaneously a plurality of glass fibers at an uncoated end portion so as to provide smooth mirror planar cut surfaces. The method of the present invention comprises the steps of removably securing each of the fibers on either side of a cutting point, placing each of the secured fibers on a resilient material provided in the region of the cutting point, scoring the outer surface of each of the fibers at the cutting point, and arcuately bending each of the fibers between the secured portions so as to impart a tension along the axial direction of each of the fibers, whereby the cutting occurs at the cutting point.

The first embodiment of the apparatus of the present invention comprises a resiliently flexible member having a resilient member provided on the upper surface thereof. A first fixing portion is disposed at a first end of the resiliently flexible member and has a clamping plate on the upper surface for removably securing each of the optical fibers at a coated portion. A second fixing portion is disposed at a second end of the resiliently flexible member and has a clamping plate on the upper surface for removably securing each of the optical fibers at an uncoated tip end. A cutting piece is provided for scoring the surface of each of the optical fibers at the cutting position along the uncoated end portions. In addition, a flexible material can be provided along the lower surface of the clamping plate of the second fixing portion, and a plurality of parallel grooves can be provided on the upper surface of the second fixing portion having center lines in the direction of the first fixing portion.

The second embodiment of the apparatus of the present invention provides for automatic cutting of the glass fibers and comprises a structure provided with a vertically moveable guiding shaft at the bottom thereof. A base is slidably disposed in the structure and is secured to the upper portion of the vertically movable guiding shaft for upward translation therewith. A leaf spring support is slidably disposed in the structure above the vertically movable guiding shaft and is separated from the base by a first plurality of compression springs. A first fiber holding member and a second fiber holding member are slidably disposed in the structure above the leaf spring support at respective ends of the leaf spring support. The first fiber holding member is secured to the structure for vertical movement by a second spring and the second fiber holding member is secured to the structure for vertical movement by a third spring. A cutter assembly is disposed in the structure above the leaf spring support. A cutter lifting member is fixedly secured to the base and extends upwardly to be disposed below the bottom surface of the cutter assembly when the base is in a normal lower position. After the fibers to be cut are inserted in an opening in the structure, the entire sequence of steps of the method of the present invention take place as the vertically movable guiding shaft is moved upwardly to its furthest upper position.

DETAILED DESCRIPTION OF THE INVENTION

Figure 1:
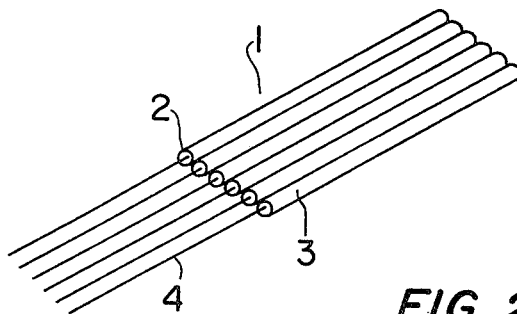
FIG. 1 is a perspective view of the fibers to be cut in accordance with the method and apparatus of the present invention.

A perspective view of a plurality of fibers 1 to be cut is shown in FIG. 1. As shown, the fibers 1 are linearly aligned with each other, and the coating layers 2 of the respective fibers 1 have been mutually bonded by heating. Thereafter, the coating layers 2 at the cut edge side are removed so as to expose raw lines 4 on which surfaces the cut is to be made.

Figure 2:
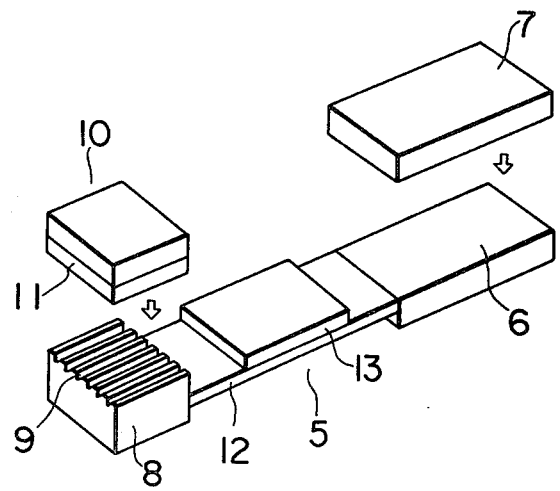
FIG. 2 is a perspective view of the first embodiment of the cutting apparatus which performs the cutting of the fibers in accordance with the method of the present invention.
Figure 3:
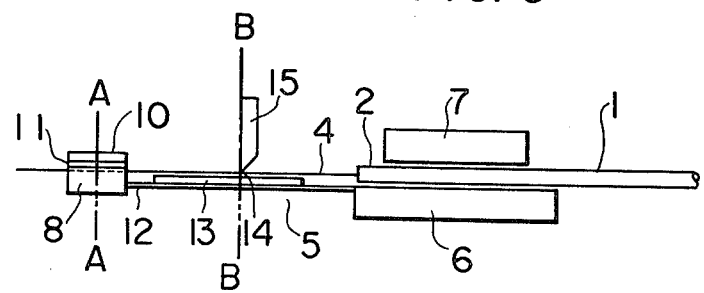
FIG. 3 is a side view showing the fibers mounted for cutting on the cutting apparatus shown in FIG. 2, and shows the cutter 15 in scoring engagement with the surfaces of the uncoated fibers at the cutting point.

A perspective view of a first embodiment of a cutting device 5 which carries out the cutting method of the present invention is shown in FIG. 2. FIG. 3 is a side view showing the cutting state of the fibers mounted in the device of FIG. 2.

The coated portions 3 of the plurality of fibers 1 are placed on a coating support portion 6 of the cutting device 5 and are fixed thereto by a clamping plate 7.

Figure 6:
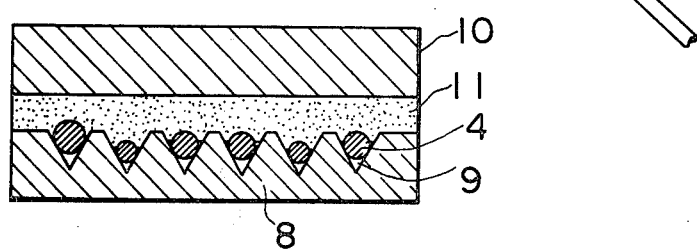
FIGS. 6 and 7 show cross-sectional views taken along the lines A—A and lines B—B of FIG. 3, respectively.

The portions of the respective raw-lines 4 are placed in respective grooves 9 provided in parallel in the top surface of an uncoated line fixing portion 8. The respective raw lines are held in the grooves 9 by a flexing member 11 provided on the lower surface of a clamping plate 10 that is clamped onto uncoated line fixing portion 8, as shown in FIG. 2. Even if the outer diameters of raw lines 4 are different, the flexing member 11 exhibits a sufficient non-permanent deformation to provide sufficient fixing of raw lines 4, as shown in FIG. 6. The materials used to make the flexible member 11 are, for example, rubber, plastic and synthetic materials. Thus, fixing of the raw fibers 1 to the cutting device 5 has been completed.

The fixing portions 6 and 8 of the cutting devices are interconnected by a leaf spring 12 having a resilient member 13 provided on its upper surface.

As shown in FIG. 3, upon the completion of fixing of the raw fibers 1, a cutter 15 made, for example, of diamond or ultra-hard alloy, is brought into pressing engagement with the raw lines 4 at the desired cutting position 14, whereby all of the lines at the pressing points are scored by the cutter 15.

Figure 7:
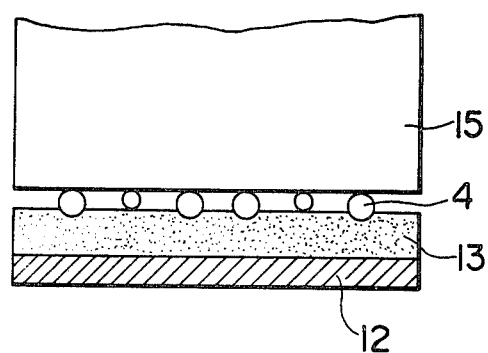

The primary effect produced by the resilient member 13 is to apply uniformly the cutting force of cutter 15 to all of the surfaces of the line 4 at the cutting points, as shown in FIG. 7. A suitable material for resilient member 13 is rubber or plastic or the like.

If the lines 1 are directly placed on a rigid member, such as metal plate, a part of the cut surface may be damaged if the cutting force to perform the required scoring is too great. In contrast, the smooth edge surface may not be obtained if the cutting force is too small, even in the case where the outer diameter of the lines 1 are equal.

The secondary effect produced by the resilient member 13 is to make uniform the cutter force applied to the raw lines even in the case when the cutter pressing force is not uniform. Thus, the desired smooth mirror surfaces can be obtained regardless of operator handling or the operational condition of the cutter.

As determined by the inventors through experiments, the pressing force needed to be applied by the cutter 15 to a single uncoated line 4 so as to obtained the desired scoring of the surface is about 10 grams.

Figure 4:
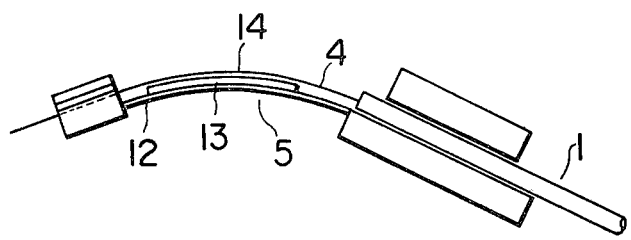
FIGS. 4 and 5 are explanatory illustrations showing the arcuate bending of the cutting apparatus of FIG. 2 to apply tension axially to the uncoated fibers after scoring so as to cause the cutting to occur.
Figure 5:
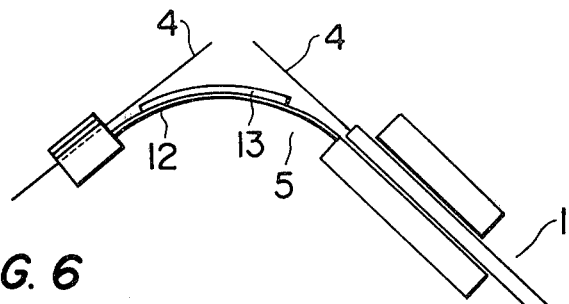

Next, the leaf spring 12 of the cutting device 5 is bent arcuately so as to exert tension on the uncoated lines 4 in an axial direction thereof, as shown in FIG. 4. The tension causes the uncoated lines 4 to break along the scored points so as to produce the required smooth surfaces perpendicular to the axes of the lines 4.

Although the explanation given above has been in terms of a plurality of fibers 1, is apparent that a single fiber 1 can also be cut in accordance with the method of the present invention.

Because the resilient member 13 is adhered to the upper surface of the leaf spring 12, a substantially uniform cutting force is applied to the uncoated lines 4 regardless of the outer diameters thereof. In addition, because the leaf spring 12 of the cutting device 5 is bent arcuately so as to exert tension on the uncoated lines 4 along the axial directions thereof, the desired perpendicular smooth mirror cut surface can be obtained at the point of scoring on the uncoated lines 4.

Another embodiment of an apparatus for carrying out the cutting operation of the method of the present invention is now described.

Briefly, this embodiment of the apparatus of the present invention is characterized in that a support having a leaf spring is raised by the operation of a guide which is vertically movable and supports the coating portions and fiber portions of the optical fiber line. Then, the fiber surfaces at the cutter positions are brought into scoring engagement against the cutter by further ascending of the support. Therefore, a cutter accomodating member is urged upwardly by a cutter lifting member so that the leaf spring is bent upwardly by a stem so that a tension is provided to the uncoated lines along the axial directions thereof, causing the cut to occur.

The present embodiment of the apparatus of the present invention is described with reference to FIGS. 8 to 13.

Figure 9:
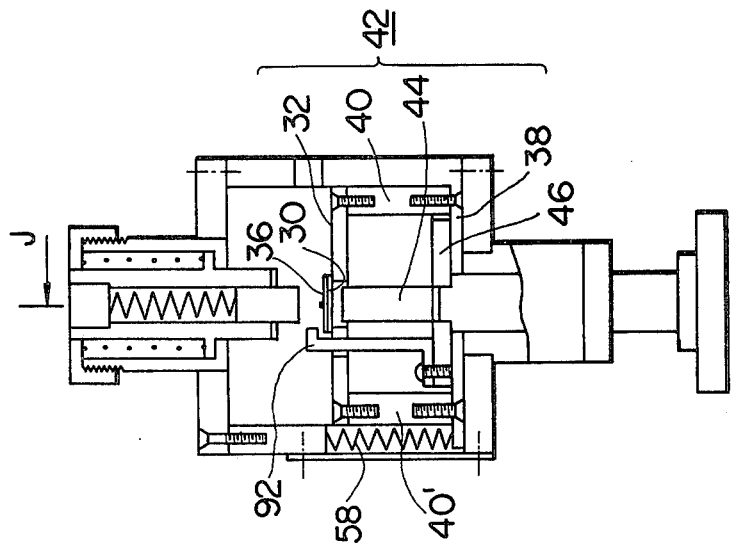
FIGS. 9, 10, 11 and 12 are cross-sectional views of the second embodiment of the cutting apparatus taken along lines D—D, E—E, C—C, and G—G of FIG. 8, respectively.
Figure 8:
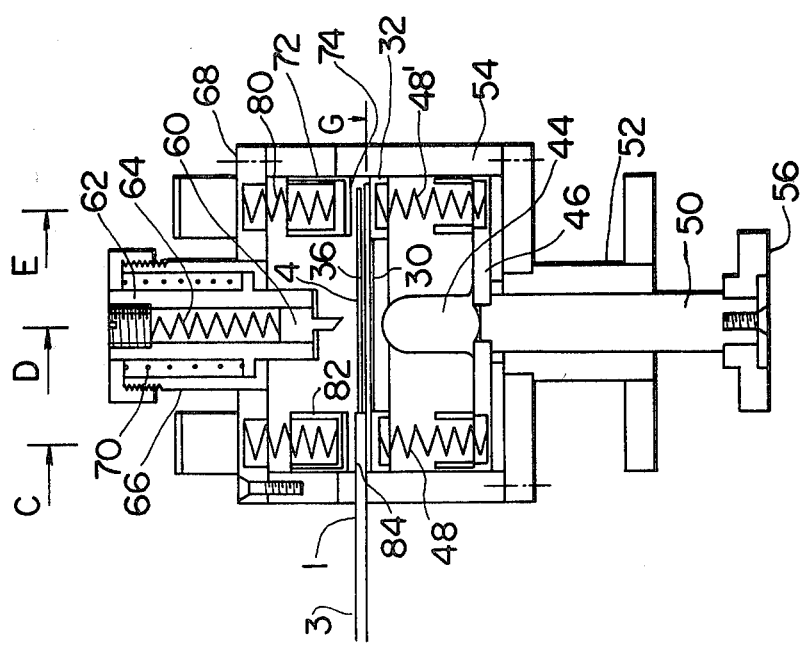
FIG. 8 is a front view of the second embodiment of the cutting apparatus which performs the cutting of the fibers in accordance with the method of the present invention (line J—J of FIG. 9)
Figure 10:
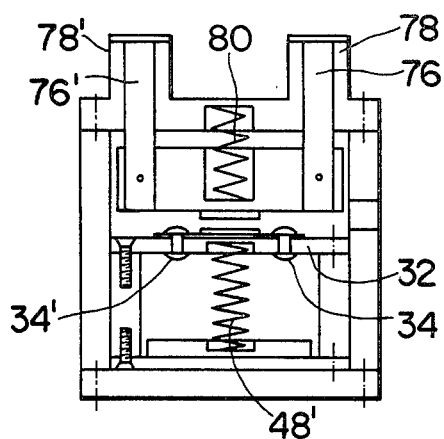

Referring now to FIGS. 8 and 9, reference numeral 30 designates a leaf spring having one end fixed to a vertically movable base 32 by rivets 34, 34', as shown by FIG. 10, and having the other end free. A rubber plate 36 is adhered to the upper surface of leaf spring 30.

As shown in FIG. 9, the vertically movable base 32 is connected to a lower base 38 by side spacers 40, 40'. The base 32, spacers 40, 40', and lower base 38 are collectively referred to as leaf spring support 42.

As shown in FIG. 8, a reference numeral 44 designates a stem connected to a base 46 for bending the leaf spring 30.

Interposed between bases 46 and 32 are provided compression springs 48, 48' so as to urge mutually these bases into opposite directions.

Figure 11:
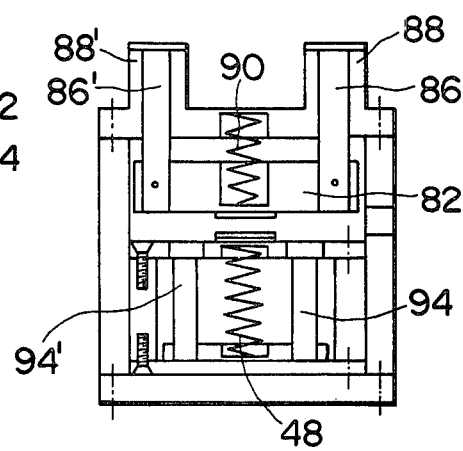
Figure 12:
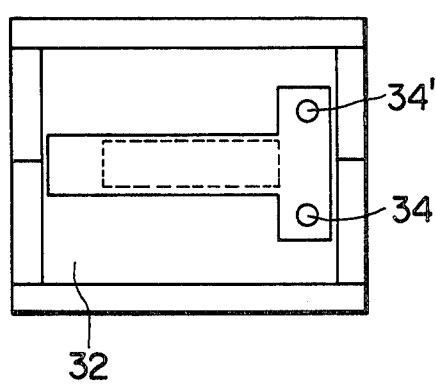

Reference numeral 50 denotes a guiding shaft for guiding the base 46 along a boss 52. Reference numeral 54 denotes a frame for guiding the vertical movement of the leaf spring support 42. Reference numeral 56 designates an operational piece. A compression spring 58 is interposed between the leaf spring support 42 and the frame 54 to urge downwardly the leaf spring support 42, as showing in FIG. 9. A cutter 60 is housed in a cutter accomodating member 62. The cutter 60 is urged downwardly by a spring 64. The accomodating member 62 is housed in a guiding cylinder 66 fixed to an upper plate 68 and is urged downwardly by a spring 70. A fiber holding member 72 is provided with a rubber plate 74 along the lower surface thereof. The fiber holding member 72 is fixed to guide shafts 76, 76', as shown in FIG. 6, and is vertically slidable in bosses 78, 78'. Further, as shown in FIG. 8, a compression spring 80 is mounted between the upper plate 68 and the fiber holding member 72 so as to urge downwardly the member 72. Similarly, a coating portion holding member 82 is provided with a rubber plate 84 at the lower surface thereof. As shown in FIG. 11, the coating portion holding member 82 is fixed to guide shafts 86, 86' and is vertically slidable in guiding bosses 88, 88'. Further, a compression spring 90 is mounted between upper holding plate 68 and the coating portion holding member 82, so as to urge downwardly the member 82. Reference numeral 92 designates a cutter lifting member fixed to the base 42 for lifting the cutter accomodating member 62, as shown in FIG. 9.

Figure 13:
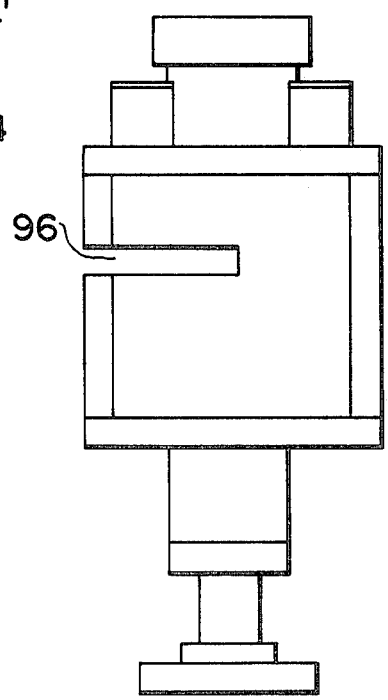
FIG. 13 is an illustration showing the input opening for the optical fiber to be cut.

Reference numerals 94, 94', as shown in FIG. 11 designate lifting rods for lifting the coated portion holding member 82 so as to release the holding of the coated fibers 3 at the final step of the cutting operation to allow the coated fibers 1 to be removed from the present embodiment. Reference numeral 96 denotes insertion openings for the coated fibers 3, as shown in FIG. 13.

The operation of the cutting device according to this embodiment is now explained.

The coated fibers 3 having the coating layers 2 removed therefrom are inserted into the core insertion opening 96. Next, the vertically movable guiding shaft 50 is lifted by upwardly pushing the operational piece 56 to lift the base 46, so that the leaf spring support 42 is lifted by the action of the compression springs 48, 48'.

This results with the uncoated lines 4 being held by the engagement between the rubber plate 36 fastened to the leaf spring 30 and the rubber plate 94 of the fiber holding member 28. Meanwhile, the coating layer 2 is held by the engagement between the rubber plate 36 and the rubber plate 86 of the coating portion holding member 82. Because the resultant force of the springs 80 and 64 is smaller than the resultant force of the spring 48, 48', the fiber holding member 72 and coating portion holding member 82 are lifted by the further urging of the operational piece 56. Immediately thereafter, the tip of the cutter 60 abuts the uncoated lines 4, whereat the cutter 60 is urged toward the uncoated lines 4 by the biasing force of the spring 64 to obtain thereby the scoring in the surfaces of the uncoated lines 4. By the further urging of the operational piece 56, the tip of the cutter lifting member 92 abuts the lower surface of the cutter accomodating member 62, to thereby lift the cutter accomodating member 62. Next, the fiber holding member 72 abuts the lower surface of the upper plate 68. In this case, the coating portion holding member 82 does not abut the upper plate 68. Further, by the upward movement of the operational piece 56, springs 48, 48' begin to be compressed, so that the base 46 begins to be lifted while the leaf spring support 42 is maintained in its position. Cutter 66 is further lifted by the action of the cutter lifting member 92, and the stem 44 for bending the leaf spring 30 abuts the lower surface of the leaf spring 32 so as to upwardly flex same, thereby causing the uncoated lines 4 to break along the respective cutter positions 14. By the further lifting of the operational piece 56, the tip of the lifting rod 94, which lifts the coating portion holding member 82, abuts the lower surface of the coating portion holding member 82 thereby lifting same, resulting in that the holding of the coating layer 2 of the coated fibers 3 are released and cut coated fibers 3 can be removed therefrom.

As explained above, in the present embodiment for automatically cutting the optical fiber according to the method of the present invention, it is possible to sequentially achieve the following operational steps in a single operation by lifting the operational piece: holding of the coated fibers 3 and the uncoated lines 4, scoring of the surfaces of the uncoated lines 4 by the cutter 60 at the cutting position 14, bending of the leaf spring 30 so as to provide tension along the axial direction of the coated fibers, and releasing of the coated fiber 3. That is, in the present embodiment, the cutting operation of the fibers 1 is carried out in a single operation, and the present embodiment is extremely efficient and practical to use.

What is claimed is:

1. A method of cutting at least one uncoated optical fiber using a leaf spring having a fixing portion at each end and a resilient material provided on the upper surface between said fixing portions, said method comprising the steps of:
   (a) placing each said uncoated optical fiber on said resilient material in alignment with said two fixing portions;
   (b) clamping each said uncoated optical fiber at each of said fixing portions;
   (c) scoring the outer surface of each said uncoated optical fiber at a cutting point; and,
   (d) arcuately flexing said leaf spring outwardly in the direction of said resilient material so as to impart a tension along the axial direction of each said uncoated optical fiber, whereby said cutting occurs at said cutting point.

2. An apparatus for cutting at least one optical fiber at an uncoated end portion, comprising:
   (a) a resiliently flexible member having a resilient member provided on the upper surface thereof, said resiliently flexible member having a first end and a second end;
   (b) a first fixing portion provided at said first end of said resiliently flexible member, said first fixing portion having a clamping plate on the upper surface for removably securing each said optical fiber at a coated portion; and
   (c) a second fixing portion provided at said second end of said resiliently flexible member, said second fixing portion having a clamping plate on the upper surface for removably securing each said optical fiber at an uncoated tip.

3. The apparatus as recited in claim 1, further comprising a cutting piece for scoring the surface of each said optical fiber at a cutting portion along said uncoated end portion.

4. The apparatus as recited in claim 3, further comprising a plurality of parallel grooves provided on the upper surface of said second fixing portion, the center line of each groove being in the direction of said first fixing portion.

5. The apparatus as recited in claim 3, further comprising a flexible material provided along the lower surface of said clamping plate of said second fixing portion.

6. The apparatus as recited in claim 5, further comprising a plurality of parallel grooves provided on the upper surface of said second fixing portion, the center line of each groove being in the direction of said first fixing portion.

* * * * *